3,154,564
OLEANDOMYCIN DERIVATIVES

Walter D. Celmer, New London, Conn., assignor to Chas. Pfizer & Co., Inc., New York, N.Y., a corporation of Delaware
No Drawing. Filed Oct. 8, 1962, Ser. No. 229,176
7 Claims. (Cl. 260—343)

This invention relates to new and useful antibiotic derivatives in the macrolide series. More particularly, it is concerned with the N-oxide derivatives of certain oleandomycin acyl esters wherein the acyl moiety is derived from an alkane hydrocarbon carboxylic acid having from two to three carbon atoms. These novel compounds are all of value as therapeutic agents.

In accordance with the present invention, the aforementioned N-oxide derivatives of oleandomycin all have the following general structural formula:

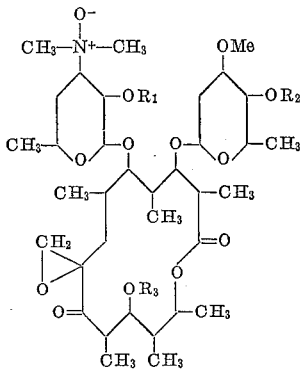

wherein each of $R_1$, $R_2$ and $R_3$ is a member chosen from the group consisting of hydrogen, acetyl and propionyl, at least one of said $R_1$, $R_2$ and $R_3$ groups always being a member other than hydrogen. Typical of the member compounds of this invention are such N-oxide antibiotic acyl esters as 1,2,3-triacetyloleandomycin N-oxide, 1-monopropionyloleandomycin N-oxide, 2,3-diacetyloleandomycin N-oxide, 1,2,3-tripropionyloleandomycin N-oxide, 1,2-diacetyloleandomycin N-oxide, 1-monoacetyloleandomycin N-oxide, and the like.

The advantages possessed by the compounds of the present invention are manifold: for instance, (1) they are remarkably effective in vivo against both *Staph. aureus* 5 (*Staphylococcus pyogenes* var. *aureus*, an antibiotic-sensitive microorganism) and *Staph. aureus* 400 (an antibiotic-resistant strain of *Staphylococcus pyogenes* var. *aureus*) infections via either the oral or parenteral routes, despite the fact that they are almost totally inactive against both microorganisms when tested in vitro; (2) they afford more prolonged therapeutic serum levels than do the corresponding non-oxides from which they are derived; (3) they provide highly desirable injectable dosage forms which cause no irritation at the site of infection even 24 hours after they are so administered, thus fulfilling a significant need in this respect when dealing with such type antibiotics; and finally, (4) the adverse taste properties of the parent antibiotic esters in solution are favorably altered in the present instance so that suitable oral dosage forms can be prepared which are of value in this connection. Other objects and advantages of the present invention will be apparent to those skilled in the art from the description which follows.

The process employed for preparing the novel compounds of this invention involves treating an appropriate macrolide antibiotic acyl ester with either hydrogen peroxide or with a peroxy acid such as peracetic acid, perbenzoic acid, monoperphthalic acid or persulfuric acid, etc. These acids can either be generated in the reaction mixture in situ using mixtures of hydrogen peroxide and the appropriate acid or they can be prepared first independently and then used as such in the reaction mixture. In general, the reaction is normally conducted at temperatures which range from about −40° C. up to about 25° C. The time period will vary from about 1.5 to about 64 hours, with the less-reactive weaker bases such as those having an acyl substituent at the 1-position of the molecule generally requiring the longer time. This method can also be used to prepare the corresponding N-oxides of erythromycin, viz., 1-monoacetylerythromycin N-oxide and 1-monopropionylerythromycin N-oxide. In carrying out the process of this invention with a peroxy acid, it is preferable to employ a reaction-inert organic solvent such as one of the halogenated hydrocarbon solvents like methylene chloride, ethylene dichloride, trichloroethylene, s-tetrachlorethane, etc., or an aromatic hydrocarbon solvent such as benzene, toluene, xylene, and so forth, although one may also use water instead and still achieve satisfactory results. In the case where hydrogen peroxide is the reagent of choice, a lower alkanolic solvent such as methanol, ethanol or isopropanol is generally preferred and this is often used in conjunction with water when it is desired to further dilute the peroxide content of the reaction mixture.

The N-oxides so formed from this reaction are generally isolated from the reaction mixture by first diluting same with water and then neutralizing the aqueous mixture with an alkaline reagent either before extracting with an organic solvent or else in the presence of same. If an organic solvent were used in the first place as a suitable medium in which to conduct the reaction, then, of course, the resulting reaction solution could be washed as such with the aqueous alkaline reagent. In either case, the washed and neutralized organic solution is subsequently dried and concentrated as such in vacuo to afford the desired product. Needless to say, the above referred to neutralization step can be dispensed with when hydrogen peroxide is employed as the reagent since no acid by-product would thereby be produced during the course of the reaction. In such a case, the lower alkanol solvent is merely evaporated from the mixture, and the desired product subsequently allowed to crystallize therefrom or else taken up in one of the aforementioned halogenated hydrocarbon solvents and treated as described before.

Like the marcolide antibiotic acyl ester bases from which they are derived, the N-oxide derivatives of this invention are capable of forming a wide variety of stable salts with mineral acids such as hydrochloric, hydrobromic, sulfuric and phosphoric, as well as with the stronger organic acids such as oxalic, maleic, fumaric, tartaric, citric, benzoic, phthalic, salicylic, dichloroacetic, benezenesulfonic, p-toluenesulfonic, α- or β-naphthalenesulfonic, methanesulfonic, ethanesulfonic, and the like. With weaker acids like acetic, propionic, lauric, stearic, oleic, lactic, etc., the salts formed all tend to hydrolyze on dissolution in water. Of course, the salts formed in general should all be non-toxic in nature when they are intended to be used for therapeutic purposes. These acid addition salts can either be obtained directly from the aforementioned organic solution of the free N-oxide antibiotic base by treatment with the appropriate acid followed by concentration of the resulting solution in vacuo, or else they can be prepared from the pure crystalline N-oxides as such. Alternatively, it is also possible to prepare these salts by treating the corresponding macrolide antibiotic ester salts (the corresponding N-deoxy compounds) with a peroxyacid in the same manner as hereinbefore described for the corresponding bases.

As previously indicated, the N-oxide derivatives of the present invention are all readily adapted to therapeutic use for the treatment of microbial infections. For instance, the $PD_{50}$ value for 1,2,3-triacetyloleandomycin N-oxide when administered subcutaneously to rats is 66 mg./kg. vs. *Staphylococcus aureus* 5 as compared to a corresponding value of 78 mg./kg. for the parent 1,2,3-triacetyloleandomycin base itself. Furthermore, the toxicity of these compounds have been found to be quite low when they are administered to mice in amounts which are sufficient to achieve the desired therapeutic effects, e.g., the $LD_{50}$ value for 1,2,3-triacetyloleandomycin N-oxide in such animals has been found to be no different substantially from that for 1,2,3-triacetyloleandomycin. As a matter of fact, 100% of the animals were still alive after four days in the case of treatment with 1,2,3-triacetyloleandomycin N-oxide at the 1000 mg./kg. dosage level. Moreover, no other adverse pharmacological side effects, such as liver damage, have been observed to occur as a result of the administration of these particular antibiotic compounds to animals.

The biological activity of these particular N-oxide derivatives is well illustrated herein by a series of tests that were performed in vivo with mice using *Staphylococcus aureus* 5 as the infecting organism of choice. In this particular case, animals of substantially uniform weight were intraperitoneally infected with the aforesaid strain of microorganism after having first been treated with the antibiotic in question at various different dosage levels via the oral route of administration. A total of ten animals were used for each dose level tested and the tests themselves were repeated in either duplicate or triplicate. The results obtained in this manner are summarized below in Table I where 1,2,3-triacetyloleandomycin (TAO base) and 1,2,3-triacetyloleandomycin N-oxide (TAO-N-oxide base) are the antibiotics compared, and the values expressed therein represent the actual percent survivals of the treated animals in each case.

TABLE I

| Antibiotic | Pre-dosage, mg./kg. | Percent Survival | | | |
|---|---|---|---|---|---|
| | | 1 hr. | 4 hrs. | 6 hrs. | 24 hrs. |
| TAO-N-oxide | 200 | 100 | 97 | 95 | 80 |
| Do | 100 | 100 | 90 | 65 | 50 |
| Do | 50 | 86 | 60 | 55 | 25 |
| Do | 25 | 73 | 26 | 30 | 5 |
| TAO base | 200 | 70 | 55 | 50 | 20 |
| Do | 100 | 85 | 60 | 40 | 20 |
| Do | 50 | 70 | 25 | 30 | 0 |
| Do | 25 | 20 | 15 | 20 | 0 |

In accordance with a method of treatment of the present invention, the herein described compounds can be administered to an infected subject via the oral or parenteral routes. In general, these compounds are most desirably administered in doses ranging from about 150 mg. up to about 2000 mg. per day, although variations will necessarily occur depending upon the weight of the subject being treated and the particular route of administration chosen. However, a dosage level that is in the range of from about 2.2 mg. to about 30 mg. per kg. of body weight per day is most desirably employed in order to achieve effective results. Nevertheless, it is to be appreciated that still other variations may also occur in this respect, depending upon the species of animal being treated and its individual response to said medicament, as well as on the particular type of pharmaceutical formulation chosen and the time period and interval at which such administration is carried out. In some instances, dosage levels below the lower limit of the aforesaid range may be more than adequate, while in other cases still larger dosages may be employed without causing any harmful or deleterious side effects to occur provided that such higher dose levels are first divided into several smaller doses that are to be administered throughout the day.

In connection with the use of the macrolide antibiotic acyl ester N-oxide compounds of this invention for the treatment of infected subjects, it is to be noted that they may be administered either alone or in combination with pharmaceutically acceptable carriers by either of the routes previously indicated, and that such administration can be carried out in both single and multiple dosages. More particularly, the novel compounds of this invention can be administered in a wide variety of different dosage forms, i.e., they may be combined with various pharmaceutically acceptable inert carriers in the form of tablets, capsules, lozenges, troches, hard candies, powders, sprays, aqueous suspensions, injectable solutions, elixirs, syrups, and the like. Such carriers include solid diluents or fillers, sterile aqueous media and various non-toxic organic solvents, etc. Moreover, the oral pharmaceutical compositions can be suitably sweetened and/or flavored by means of various agents of the type commonly employed for just such a purpose. In general, the therapeutically-effective compounds of this invention are present in such dosage forms at concentration levels ranging from about 0.5% up to about 90% by weight of the total composition, i.e., in amounts which are sufficient to provide the desired unit dosage previously indicated.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia. Additionally, lubricating agents such as magnesium stearate, sodium lauryl sulfate and talc are often very useful for tabletting purposes. Solid compositions of a similar type may also be employed as fillers in soft and hard-filled gelatin capsules; preferred materials in this connection would also include lactose or milk sugar as well as high molecular weight polyethylene glycols. When aqueous suspensions and/or elixirs are desired for oral administration, the essential active ingredient may be combined with various sweetening and flavoring agents, coloring matter or dyes and, if so desired, emulsifying and/or suspending agents, together with such diluents as water, ethanol, propylene glycol, gylcerin and various like combinations thereof.

For purposes of parenteral administration, solutions of these particular macrolide antibiotic acyl ester N-oxides in sesame, coconut or peanut oil, or in diethyl carbonate or dimethylformamide, or in aqueous ascorbic acid or 10% glutamic acid (as the hydrochloride) may be employed, as well as sterile aqueous solutions of the corresponding water-soluble acid addition salts themselves, as previously enumerated. Such aqueous solutions should be suitably buffered if necessary and the liquid diluent first rendered isotonic with sufficient saline or glucose. These particular aqueous solutions are especially suitable for intravenous or intramuscular injection purposes. In this connection, the sterile aqueous media employed are readily obtainable by standard techniques well-known to those skilled in the art. For instance, distilled water is ordinarily used as the liquid diluent and the final preparation is passed through a suitable bacterial filter, such as a sintered-glass filter or a diatomaceous-earth or unglazed porcelain filter. Preferred filters of this type include the Berkefeld, the Chamberland and the asbestos disc-metal Seitz filter, wherein the fluid is sucked through the filter candle into a sterile container with the aid of a suction pump. Needless to say, the necessary steps should be taken throughout the preparation of these injectable solutions to ensure that the final products are obtained in a sterile condition.

This invention is further illustrated by the following examples, which are not to be construed in any way as imposing limitations upon the scope thereof. On the contrary, it is to be clearly understood that resort may be had to various other embodiments, modifications and equivalents thereof which readily suggest themselves to

Example I

In a 12-liter, two-necked round-bottomed flask equipped with mechanical stirrer and set in a 100-liter aluminum tank filled with crushed ice (40 liters) and methanol (4 gal.), were placed 1 kg. (1.23 moles) of 1,2,3-triacetyl-oleandomycin (see U.S. Patent No. 3,022,219 for its preparation) dissolved in 6 liters of methylene chloride. Stirring was commenced and when the temperature of the solution had dropped to $-20°$ C. (this required about one hour and ten minutes), 280 g. of 40% peroxy acetic acid (peracetic acid) were slowly added thereto from a 500 ml. dropping funnel during the course of an eighty minute period. During this time, the temperature of the reaction mixture was not allowed to rise above $-16°$ C. After allowing the mixture to stir for an additional twenty minutes, it was poured into a separatory funnel containing 8 liters of 0.5 M disodium hydrogen phosphate solution, and the two phases were shaken (for one minute) and then left to separate. The aqueous phase was then discarded and the methylene chloride phase was re-extracted with a fresh portion (8 liters) of 0.5 M disodium hydrogen phosphate; this procedure was repeated once again. The separated methylene chloride layer was next washed twice with two successive 6-liter portions of water. The washed methylene chloride solution was then dried over 5 lbs. (approx.) of anhydrous sodium sulfate with vigorous stirring and the filtered solution was subsequently concentrated under reduced pressure to a total volume of 2.5 liters. At this point, 4.5 liters of anhydrous diethyl ether were rapidly added to the concentrate and the resulting hazy solution stirred for five minutes before an additional amount (two liters) of ether was added. Vigorous mechanical stirring of the mixture was then continued for about one more hour. The crystalline material which separated was then collected on a filter funnel and air-dried overnight for about 16 hours. The yield of product obtained in this manner amounted to 870 g. (87%) of pure 1,2,3-triacetyloleandomycin N-oxide, M.P. 110–112° C.; $[\alpha]_D^{25}$ $-25°$ (5%; $CHCl_3$).

*Analysis.*—Calcd. for $C_{41}H_{67}NO_{16} \cdot 2H_2O$: C, 56.86; H, 8.23; N, 1.61; $H_2O$, 4.15. Found: C, 57.03; H, 8.24; N, 1.60; $H_2O$, 3.92 (K. Fischer).

Example II

To a solution of 10 ml. of 40% peracetic acid in 100 ml. of water, there was added 7 g. of 1-monoacetyloleandomycin. The resulting solution was then allowed to stand at room temperature ($\sim 25°$ C.) for 64 hours, after which time it was poured into 200 ml. of water containing an equal volume of crushed ice plus 200 ml. of chloroform. The pH of the aqueous phase was then adjusted from 4.3 to 8.5 with 0.5 M disodium hydrogen phosphate and the aqueous phase discarded, while the separated chloroform phase was subsequently washed three times with equal volumes of water. After drying over anhydrous sodium sulfate and filtering, there was obtained a clear solution which on subsequent evaporation in vacuo afforded a white solid residue. Careful trituration of the latter material with anhydrous diethyl ether then gave 3.2 g. of crystalline 1-monoacetyloleandomycin N-oxide, M.P. 126–128° C.

Example III

The procedure described in the preceding example was repeated employing an equal amount (7 g.) of 1,2-diacetyloleandomycin as starting material in place of the monoacetyl compound used in Example II. In this manner, there were obtained 3.3 g. of crystalline 1,2-diacetyloleandomycin N-oxide, M.P. 117–121° C.

Example IV

A solution of peracetic acid (2.5 ml., 40%) in water (25 ml.) was used to dissolve 2 g. of 1,3-diacetyloleandomycin. Thereafter, the reaction mixture was worked up in the same manner as described in the preceding two examples except that only about half the original volume of water-ice-chloroform was used (actually, 75 ml. of water plus an equal volume of crushed ice layered over 100 ml. of chloroform). The yield of crystalline product melting at 145–147° C. amounted to 1.2 g. of 1,3-diacetyloleandomycin N-oxide.

Example V

To a solution of 480 ml. of 3% hydrogen peroxide in 720 ml. of methanol, there was added 20 g. of 2,3-diacetyloleandomycin. The resulting solution was then allowed to stand at room temperature ($\sim 25°$ C.) for 48 hours. Upon evaporation of the methanol solvent in vacuo, some solidification occurred and it was at this point (about one-half the original volume) that 500 ml. of chloroform was added to the mixture. The resulting two-phase system was then stirred for 2 hours, and the chloroform layer subsequently collected and dried over anhydrous sodium sulfate. Evaporation of the dried filtrate (in vacuo) then gave a solid residue which on trituration with diethyl ether (100 ml.) resulted in a crystalline product. In this way, there was obtained an 18 g. yield of 2,3-diacetyloleandomycin N-oxide, M.P. 182–185° C.

Example VI

The procedure described in Example V was repeated employing 2-monoacetyloleandomycin (20 g.) as starting material instead of the corresponding 2,3-diacetyl compound. In this manner, there was obtained a comparable yield of 2-monoacetyloleandomycin N-oxide as a crystalline product melting at 145–148° C.

Example VII

A solution of 35% hydrogen peroxide (25 ml.) in 360 ml. of methanol and 200 ml. of water was used to dissolve 10 g. of 3-monoacetyloleandomycin. The reaction mixture was then allowed to stand at room temperature ($\sim 25°$ C.) for 28 hours, after which time the methanol solvent was removed by means of evaporation under reduced pressure. The resulting aqueous concentrate then deposited a crystalline material in the form of long white needles, which were subsequently collected by means of suction filtration and air dried to afford 9.2 g. of 3-monoacetyloleandomycin N-oxide, M.P. 190° C.

Example VIII

The procedure of Example I is repeated except that 1.23 moles of 1,2,3-tripropionyloleandomycin are employed as the starting material of choice in this reaction in place of the corresponding triacetyl ester compound used before. In this particular case, the corresponding product obtained is 1,2,3-tripropionyloleandomycin N-oxide. In like manner, the following compounds are also prepared:

1-monopropionyloleandomycin N-oxide
1,2-dipropionyloleandomycin N-oxide
1,3-dipropionyloleandomycin N-oxide
2,3-dipropionyloleandomycin N-oxide
3-monopropionyloleandomycin N-oxide
2-monopropionyloleandomycin N-oxide All the oleandomycin acyl ester starting materials used above are prepared according to the methods described in U.S. Patent 3,022,219.

Example IX

The hydrochloride salt of 1,2,3-triacetyloleandomycin N-oxide was prepared by suspending 24 g. (ca. 0.028 mole) of the aforementioned base (as the dihydrate) in 100 ml. of water and then treating the resulting suspension with 7 ml. of 2 N hydrochloric acid. Complete solution occurred almost immediately and the solution was filtered through sintered glass to remove dust particles. An additional amount (7 ml.) of 2 N hydrochloric acid was then added to the filtrate with stirring and the resulting mixture was placed in an ice-bath. In this manner, there was obtained 22 g. (88%) of the aforesaid hydrochloride salt as the dihydrate, M.P. ca. 180° C. Elementary analysis confirmed the formula to be $C_{41}H_{67}NO_{16} \cdot 2H_2O$. The method can also be used to prepare the corresponding hydrobromide salt by merely substituting hydrobromic acid (on the same molar basis) for the hydrochloric acid used above.

In like manner, the hydrochloric and hydrobromic acid addition salts of all the N-oxide bases reported in Examples II–VIII are also prepared by employing this same procedure with the appropriate organic base as starting material.

Example X

The phosphoric acid salt of 1-monopropionyloleandomycin N-oxide is prepared by dissolving the base compound in an aqueous solution containing an equivalent amount in moles of phosphoric acid, and then evaporating or concentrating under reduced pressure the resulting aqueous solution to either dryness or to incipient crystallization, as the case may be.

In like manner, other acid addition salts of this compound as well as of the products reported in Examples I–VIII are also prepared by merely employing sulfuric acid, oxalic acid, maleic acid, phthalic acid, methanesulfonic acid, benzenesulfonic acid, p-toluenesulfonic acid, and α- or β-naphthalenesulfonic acid in place of phosphoric acid in accordance with this very same reaction procedure. In each and every case, the corresponding acyl macrolide antibiotic N-oxide acid addition salt is the product which is obtained.

Example XI

A dry solid pharmaceutical composition is prepared by blending the following materials together in the proportions by weight specified below:

| | |
|---|---|
| 1,2,3-triacetyloleandomycin N-oxide | 25 |
| Dicalcium phosphate | 30 |
| Tapioca starch | 20 |
| Lactose | 15 |
| Polyvinylpyrrolidone | 8 |
| Magnesium stearate | 2 |

After the dried composition is thoroughly blended, tablets are punched from the resulting mixture, each tablet being of such size that it contains 100 mg. of the active ingredient.

Example XII

A dry solid pharmaceutical composition is prepared by combining the following materials in the proportions by weight specified below:

| | |
|---|---|
| 1,2,3-triacetyloleandomycin N-oxide | 50 |
| Polyethylene glycol (average molecular weight, 6000) | 15 |
| Lactose | 30 |
| Calcium carbonate | 5 |

The dried solid mixture so prepared is then thoroughly agitated so as to obtain a powdered product that is completely uniform in every respect. Soft elastic and hard-filled gelatin capsules containing this pharmaceutical composition are then subsequently prepared, employing a sufficient quantity of material in each case so as to provide each capsule with 250 mg. of the active ingredient.

Example XIII

An aqueous solution containing 1,2,3-triacetyloleandomycin N-oxide is prepared by dissolving a 50:50 mixture of the latter compound and its monohydrochloride salt (both in the form of their dihydrates) in distilled water with the aid of vigorous stirring. The amount of compound employed is such that the resulting solution contains 25 mg. of the active ingredient per each ml. of solution. Upon completion of this step, the solution is sterilized by means of filtration through a Seitz filter. The sterile aqueous solution so obtained is then suitable for intramuscular administration to animals.

What is claimed is:

1. A compound selected from the group consisting of those N-oxides of the formula:

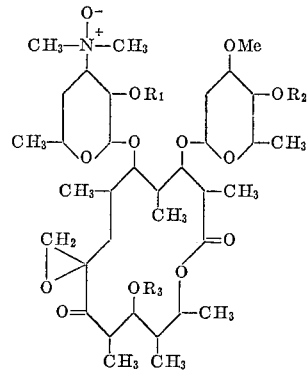

wherein each of $R_1$, $R_2$ and $R_3$ is a member chosen from the group consisting of hydrogen, acetyl and propionyl, at least one of said $R_1$, $R_2$ and $R_3$ groups always being a member other than hydrogen; and the non-toxic acid addition salts of all these compounds.

2. 1,2,3-triacetyloleandomycin N-oxide, a compound as claimed in claim 1 wherein each of $R_1$, $R_2$ and $R_3$ is acetyl.

3. 1-monoacetyloleandomycin N-oxide, a compound as claimed in claim 1 wherein $R_1$ is acetyl and each of $R_2$ and $R_3$ is hydrogen.

4. 2,3-diacetyloleandomycin N-oxide, a compound as claimed in claim 1 wherein $R_1$ is hydrogen and each of $R_2$ and $R_3$ is acetyl.

5. 1-monopropionyloleandomycin N-oxide, a compound as claimed in claim 1 wherein $R_1$ is propionyl and each of $R_2$ and $R_3$ is hydrogen.

6. 1,2-diacetyloleandomycin N-oxide, a compound as claimed in claim 1 where each of $R_1$ and $R_2$ is acetyl and $R_3$ is hydrogen.

7. 1,2,3-tripropionyloleandomycin N-oxide, a compound as claimed in claim 1 wherein each of $R_1$, $R_2$ and $R_3$ is propionyl.

References Cited in the file of this patent

UNITED STATES PATENTS 3,022,219     Celmer _____ Feb. 20, 1962

OTHER REFERENCES

Linsker et al.: Jour. Amer. Che. Soc., vol. 68, (1946), pages 192, 193.

Culvenor: Reviews of Pure and Applied Chem. vol. 3, No. 2, (June 1953), page 86.